United States Patent
Bytzek et al.

[11] Patent Number: 6,044,943
[45] Date of Patent: Apr. 4, 2000

[54] SHAFT DECOUPLER

[75] Inventors: Klaus Bytzek, Woodbridge; K. Mats Lipowski, Toronto; Jacek S. Komorowski, Bond Head; Henry W. Thomey, Gilford, all of Canada

[73] Assignee: Litens Automotive Partnership, Woodbridge, Canada

[21] Appl. No.: 08/817,799

[22] PCT Filed: Oct. 16, 1995

[86] PCT No.: PCT/CA95/00575

§ 371 Date: Aug. 1, 1997

§ 102(e) Date: Aug. 1, 1997

[87] PCT Pub. No.: WO96/12122

PCT Pub. Date: Apr. 25, 1996

[30] Foreign Application Priority Data

Oct. 14, 1994 [GB] United Kingdom .................... 9420741

[51] Int. Cl.[7] .................................. F16F 15/123
[52] U.S. Cl. ................ 192/41 R; 192/55.2; 192/56.2; 192/212; 192/77
[58] Field of Search ................ 192/41 S, 41 R, 192/56.2, 55.2, 212, 55.61, 55.7, 77

[56] References Cited

U.S. PATENT DOCUMENTS

| 3,618,730 | 11/1971 | Mould . | |
|---|---|---|---|
| 4,813,525 | 3/1989 | Rangert et al. | 192/41 S |
| 4,830,151 | 5/1989 | Numata | 192/41 S X |
| 5,156,573 | 10/1992 | Bytzek et al. | 192/41 S X |
| 5,184,705 | 2/1993 | Skiguchi et al. | 192/212 X |
| 5,377,962 | 1/1995 | Winfried et al. . | |

FOREIGN PATENT DOCUMENTS

| 2 676 789 | 11/1992 | France . |
| 19 62 011 | 6/1970 | Germany . |
| 575 067 | 2/1946 | United Kingdom . |
| 2 250 566 | 6/1992 | United Kingdom . |

*Primary Examiner*—Charles A. Marmor
*Assistant Examiner*—Saul Rodriguez
*Attorney, Agent, or Firm*—Pillsbury Madison & Sutro LLP

[57] ABSTRACT

A crankshaft decoupler has a mounting hub, a pulley rotatably mounted on the mounting hub, an annular carrier mounted within said pulley, a biasing device mounted therebetween, and a one way clutch mounted between the annular carrier and the pulley. The biasing device cushions the belt drive from crankshaft impulses and lowers the angular resonant frequency of the belt system. The one way clutch prevents sudden reversal of the belt tension in the drive due to start/stop of the engine or sudden deceleration of the engine and prevents momentary reverse slip belt squeal as a result of the tensioners' inadequate output for the reverse mode. The one way clutch limits the maximum amount of torque which may be transmitted preventing belt slippage during momentary overload.

13 Claims, 6 Drawing Sheets

SHAFT DECOUPLER

FIELD OF INVENTION

This invention relates to a crankshaft decoupler or torque modulator. In particular, this invention relates to a crankshaft decoupler having a one way clutch and a biasing assembly for reducing angular vibrations generated by the engine and the driven accessories.

BACKGROUND OF INVENTION

Automotive accessory drives utilize rubber/textile cord belts in order to transfer a portion of the available crankshaft torque to the driven accessories. The belt length is usually quite long as most accessories are usually driven with single belt.

Moreover, the engine does not produce a constant torque output but produces continuously varying torque (impulses) particularly at low speeds (idle) and heavy accessory loads. This varying torque results in roughness which is increasing as new engines are designed for more power and efficiency.

Furthermore, additional new devices, such as "dual mass" fly wheels, are being added to the powertrain increasing roughness at crankshaft speeds. The combined inertia of the accessories (alternator, cooling fan, air conditioner compressor, power steering pump, etc.) is also increasing, increasing the rate at which an engine accelerates and decelerates.

Three distinct problems are created particularly with newer engine designs. First, the long elastic belt driven by the pulsating torque of the crankshaft and in turn driving the heavy inertias of the accessories often results in an angular resonance that amplifies the tension fluctuations in the belt causing noise, vibration, tensioner wear and increased peak bearing and structural loads.

Secondly, the engine must pass through the resonant frequency momentarily when starting up or shutting down, even when a convention decoupler is used. The engine roughness is much worse at the low start up and shut down speeds. This roughness, acting at a relatively low resonant frequency, can cause large momentary tension reversals in the belt drive. A conventional belt tensioner does not have sufficient tension to cope with the reverse mode. Further, tension reversal causes the tensioner to move violently, momentarily disabling it. The result is belt squeak and occasional tensioner damage.

Thirdly, a combined load from the accessories load and their inertias will sometimes cause the belt to slip momentarily during acceleration until the peak acceleration subsides. Correcting this with belt tension or drive size is often undesirable or not possible.

Crankshaft decouplers are well known to the industry for addressing resonance problems. Crankshaft decouplers have generally all utilized rubber springs which have generally shown marginal durability. The rubber component is exposed to a harsh environment which causes the rubber to degrade which results in a loss of durability. Moreover, the performance of decouplers incorporating rubber rings must be compromised in order to obtain reliability.

Torque limiting clutches are utilized to address torque overload problems. Such clutches are described in U.S. Pat. No. 3,618,730 which utilize a first torsion spring to provide a positive connection between the driving hub and a cage and a second torsion spring to provide a circumferential frictional connection between the cage and a driven pulley. As the torque increases, the driving hub will angularly displace the cage until the second torsion spring winds down causing the second torsion spring to decrease in diameter releasing the circumferential engagement. After the maximum torque has been exceeded, the second torsion spring will no longer engage the driven pulley allowing it to slip.

Previous devices normally rely upon a wrap spring to limit torque. These devices have been found to be insufficiently reliable in practice.

Wrap spring, roller/sprag clutches and single band clutches have been used as one way devices. A wrap spring or roller ramp/sprag clutch all engage in a harsh, high shock manner which increases stress and reduces reliability. A single band clutch does not provide sufficient drive capability at low overrunning torque.

SUMMARY OF THE INVENTION

The disadvantages of the prior art may be overcome by providing a decoupler which lowers the resonant frequency of the drive and which limits the transmittable torque, particularly torque in the reverse direction.

According to one aspect of the invention, there is provided a crankshaft decoupler having a mounting hub, an inner hub rotatably mounted on the mounting hub, a biasing device coupled therebetween, a pulley rim rotatably mounted on the mounting hub and a one way clutch mounted between the inner hub and the pulley rim. The biasing device cushions the belt drive from crankshaft impulses and lowers the angular resonant frequency of the belt system.

The one way clutch prevents sudden reversal of the belt tension in the drive due to start/stop of the engine or sudden deceleration of the engine and prevents momentary reverse slip belt squeal as a result of the tensioners inadequate output for the reverse mode. The one way clutch may also limit the maximum amount of torque which may be transmitted preventing belt slippage during momentary overload.

According to another aspect of the invention, there is provided a crankshaft decoupler comprising a mounting hub drivingly mountable on a crankshaft, a drive plate mounted on the mounting hub for rotation therewith, a pulley rotatably mounted on the hub, an annular carrier mounted between the drive plate and the pulley and engaging the inner circumferential rim of the pulley, and a first bias elastically coupling the driver to the annular carrier damping rotational forces transmitted between the mounting hub and the pulley.

According to another aspect of the invention, there is provided a crankshaft decoupler comprising a mounting hub drivingly mountable on a crankshaft, a drive plate mounted on the mounting hub for rotation therewith, a pulley rotatably mounted on the hub, an annular carrier mounted on the drive plate and within an inner rim of the pulley, and a one-way clutch wrapped about the annular carrier selectively interconnecting the annular carrier to the inner rim for selectively transmitting rotational forces between the mounting hub and the pulley.

According to another aspect of the invention, there is provided a crankshaft decoupler ganged with a torsional vibration damper.

DETAILED DESCRIPTION OF THE DRAWINGS

In figures which illustrate the embodiments of the invention.

DETAILED DESCRIPTION OF THE INVENTION

Figure 1:
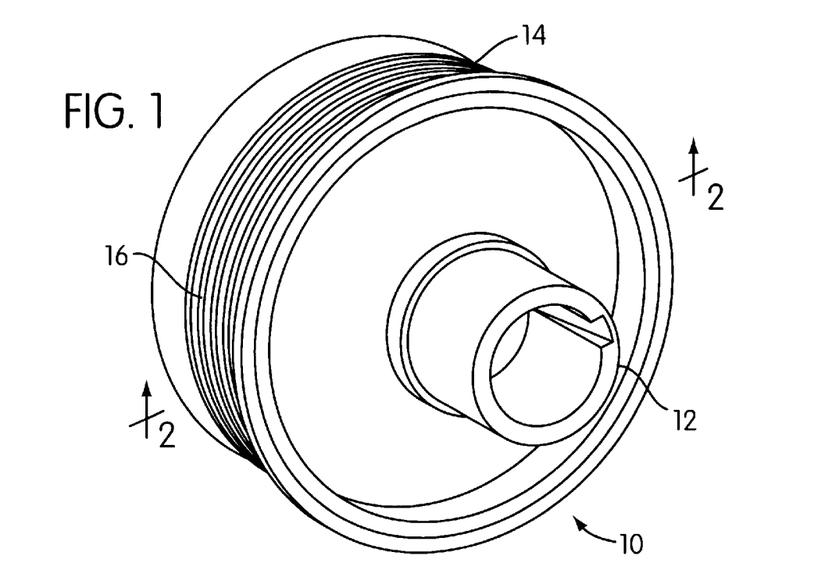
FIG. 1 is a perspective view of a first embodiment of the present invention.
Figure 2:
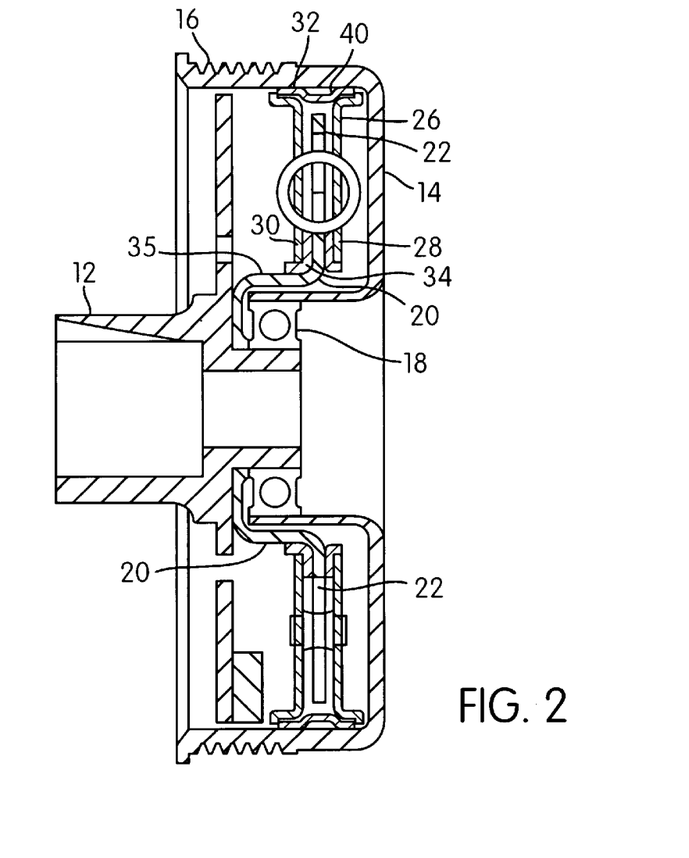
FIG. 2 is a sectional view of the embodiment of FIG. 1 along the lines 2—2.

The first embodiment of the present invention is illustrated in FIGS. 1 and 2. The crankshaft decoupler 10 generally comprises a hub 12 and a driven pulley 14 having V-grooves 16. Pulley 14 is journal mounted for rotation on hub 12. Ball bearing race 18 is used for the journal mount.

Pulley 14 is a cup-shaped pulley manufactured using well known rolling and forming methods.

Hub 12 has a slot for mounting the crankshaft decoupler 10 on a crankshaft in a driving relation. The slot receives a key for locking the hub onto the crankshaft.

Figures 3, 4, 5:
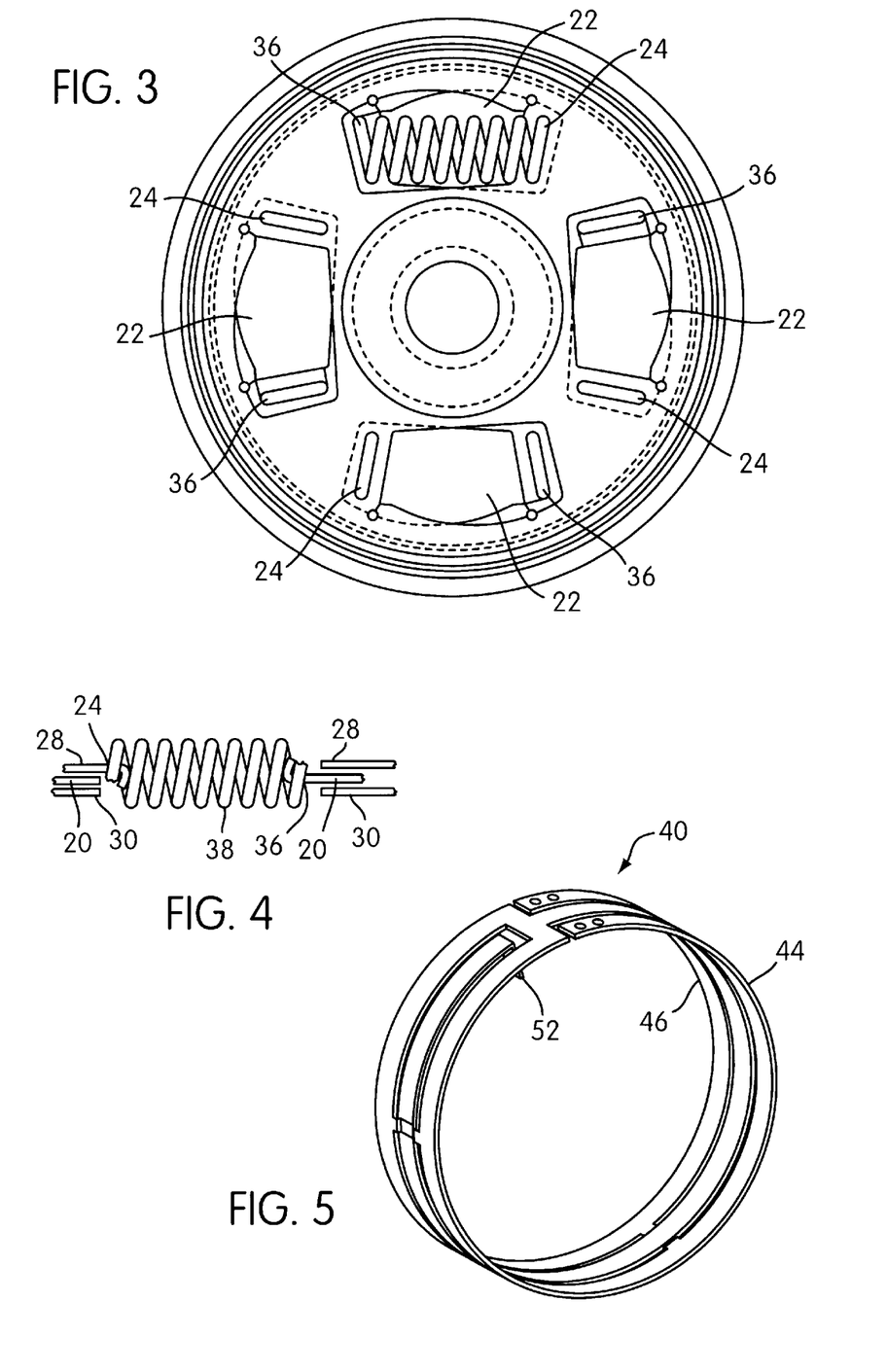
FIG. 3 is a end elevational view of the torsion spring assembly of the embodiment of FIG. 1.
FIG. 4 is a top plan view of the torsion spring assembly of FIG. 3.
FIG. 5 is a perspective view of a one-way clutch band of the embodiment of FIG. 1.

Drive plate 20 is rigidly mounted to hub 12 and may be considered as part of the hub. Drive plate 20 has a plurality of spring-receiving apertures 22. Adjacent one end of spring-receiving apertures in a clockwise direction are spring-mounting apertures 24. (FIG. 3)

An annular carrier plate 26 has two annular discs 28, 30 joined by a circumferential surface 32, defining a slot for receiving drive plate 20 therein. The end of each plate 28, 30 has a journal bearing 34 for rotatably mounting carrier plate 26 about a circumferential surface 35 of drive plate 20. Both plates 28, 30 have spring-receiving apertures 22. On one of plates 28,30 and adjacent one end of the spring-receiving apertures 22 in a counter clockwise direction are spring-mounting apertures 36. Torsion springs 38 are mounted in spring-receiving apertures 22 by inserting each end coil into spring-mounting apertures 24, 36.

Spring-receiving apertures 24, 36 are spaced from the spring-mounting apertures 22 by a distance which exceeds the relaxed spacing distance between end coils of torsion springs 38. By separating the end coils, the torsion spring can act both in compression and tension.

Figures 6, 7:
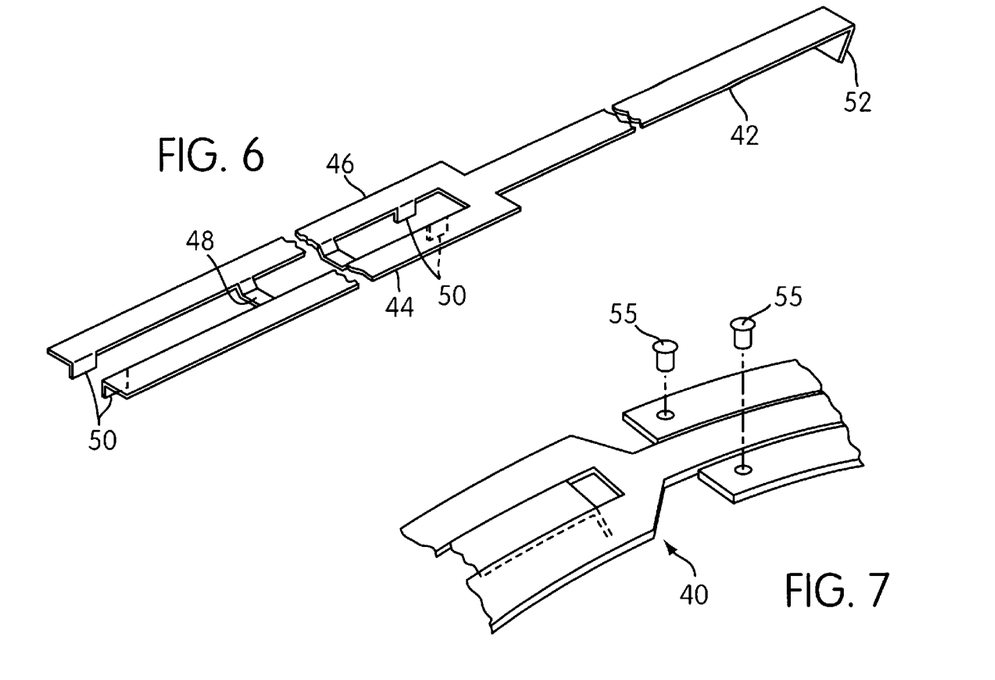
FIG. 6 is a perspective view of the one-way clutch band of FIG. 5 in an unrolled condition.
FIG. 7 is a perspective view of an overlap of the one-way clutch band of FIG. 5.

Circumferential surface 32 of carrier plate 26 has a double wrap one way clutch assembly 40. Referring to FIGS. 5, 6 and 7, the clutch assembly comprises a single band portion 42 joined to two parallel bands 44 and 46. Bands 44 and 46 are joined together by a bridge 48 for stabilizing the bands 44 and 46. Bands 44 and 46 also have tabs 50 for centralizing the band on circumferential surface 32.

Figure 8:
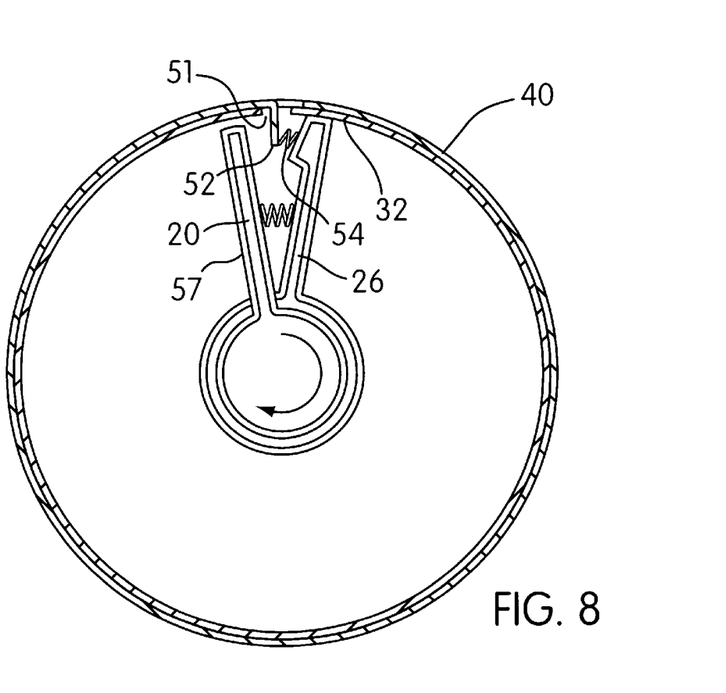
FIG. 8 is a schematic side elevational view of the one-way clutch band connection of the assembly of FIG. 5.

As illustrated in FIG. 8, circumferential surface 32 has a circumferential slot 51 for receiving end tab 52. Band 42 is lapped over bridge 48 and connects to carrier plate 26 by pre-loading spring 54. Bands 44 and 46 are connected to circumferential surface 32 of carrier plate 26. Bands 44 and 46 are connected to circumferential surface 32 using rivets 55. Other suitable fasteners such as nuts and bolts could also be used.

Clutch assembly 40 is made of a brake material. By biasing the clutch assembly with pre-loading spring 54, bands 42, 44 and 46 will slide when moved relative to an engaging surface (the inner circumferential surface of pulley 14) in one direction and will frictionally engage when slid in the opposite direction. In this manner, the carrier plate will transmit torque to the pulley 14 when rotating in one direction but will slide when urged to be rotated in the opposite or counter direction.

The crankshaft decoupler 10 inserts a torsion spring element in series with an elastic belt. This has a two fold effect. The belt drive is cushioned from the crankshaft impulses but, more significantly, the angular resonant frequency of the belt drive, which is usually at or just above idle firing frequency, is effectively lowered to a value much lower than idle firing. This avoids resonant angular response of the accessory drive during engine idle and dramatically lowers the noise, vibration wear and peak loads.

By inserting the decoupler torsion spring element in series with the belt an additional degree of freedom and a second resonant frequency are created. However, the lowest of the two can be arranged as described above so as to be below and therefore unresponsive to the engine firing frequency. The higher, second response frequency is of lower magnitude and occurs at a much smoother engine speed range and therefore is not perceivable.

Secondly, the one way clutch assembly 40 performs two beneficial functions. As explained previously, the decoupler shifts the drive resonant frequency to a value below idle firing but the one way clutch prevents tension reversal by preventing the heavy accessory inertias from over running the crankshaft during start up/shut down resonance as the one way clutch allows the outer pulley rim to free wheel at a speed faster than the crank in a forward direction.

This same free wheel capability also prevents the same driven inertias from reversing tension and causing a belt squeak during high speed engine operation when the engine is suddenly slowed. This usually occurs on hard acceleration just as the transmission shafts to a higher gear and the engine speed is forced down by the transmission.

The crankshaft decoupler 10 avoids this problem by utilizing torsion wound springs which are uniquely retained so that, while they operate in compression normally, they can momentarily be put into tension without noise or damage. Momentary torque reversals cause the tension load and will usually occur on any drive. The torsional rate possible with mechanical springs can generally be lower than for rubber with the same safety factor and this, in practice, allows better isolation and a lower system frequency. The lower system frequency not only decreases the noise vibration and harshness (NVH) perceived by the user but also reduces the torsional amplitudes and accordingly their destructive effect on the device.

The one way clutch assembly 40 has two lapped bands and a lapping band which greatly improves the ratio between drive torque and over run drag torque. Unlike the wrap spring, the clutch assembly 40 utilizes a friction material surface which permits smooth engagement and slippage without damage to the mating surface. However, it still retains the ability to provide the high drive to drag torque ratio and torque limiting potential of the wrap spring.

Incorporating the clutch at the crankshaft instead of the alternator avoids the high centrifugal forces which tend to disable an alternator clutch. When the crankshaft decoupler is placed on the crank pulley, it protects the accessory drive from all of the other accessory inertias. The alternator decoupler protects the drive from the alternator only.

Incorporating the clutch at the crank pulley protects the decoupler from severe torque reversals and eliminates drive system tension reversals which result in belt squeal. The torque reversal protection not only protects from an inertial overrun but, uniquely, prevents start up/shut down belt chirp which is an inherent characteristic of crank decouplers. This occurs, as previously noted, because, during start up or shut down, the engine firing frequency will momentarily but violently coincide with the accessory drive/decoupler resonant frequency causing severely amplified tension reversals.

Another benefit of placing one way clutch assembly 40 in the crankshaft damper is improved ball bearing life. Most crankshaft decouplers utilize a ball bearing to support the pulley rim portion but in current devices the bearing is never free to rotate but only to oscillate. The oscillation results in shorter bearing life as the balls and races wear only on one location. The clutch insures that beneficial rotation takes place in order to distribute bearing wear.

Another potential benefit may be a slightly higher accessory speed than the engine idle speed. Tests have shown that the one way clutch assembly 40 may provide as much as a 5% increase in accessory speed as a consequence of slight, continuous over run. This has a positive effect on alternator output.

A further benefit of the band type one way clutch over others is that it utilizes the underside of the pulley rim, an area usually unused, and this makes the decoupler more compact. This surface is located at the largest possible radius and this provides a large surface area which reduces wear and dissipates heat. The device is also thin in section being easily packaged. Located at a large radius, it minimizes the tangential loading for a given torque. This improves the reliability of the components and joints.

Figure 9:
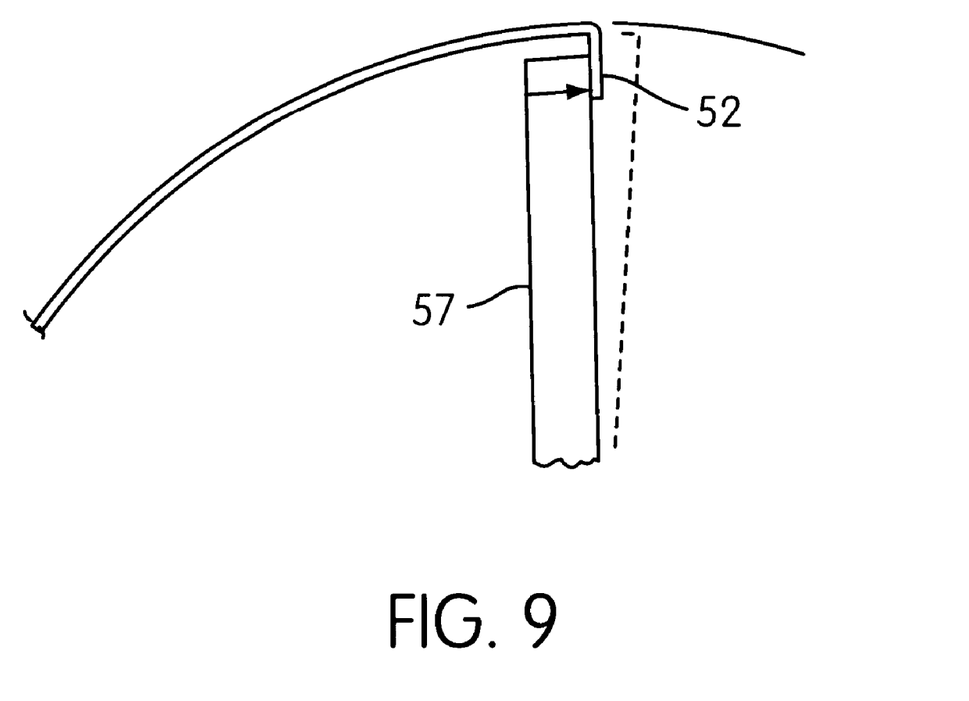
FIG. 9 is schematic elevational view of the connection of FIG. 8.

Additionally, the amount of positive clutch torque capacity may be varied by adjusting the value of the excitation spring 54. As illustrated in FIGS. 8 and 9, the clutch assembly 40 is capable of being used as a torque limiter by employing a finger 57 on the driver plate 20 which touches the free end of the band causing it to be pulled away from the cylindrical drum surface formed on the interior of pulley 14 and thus partially reducing its torque capacity. The finger 57 contacts the band only when the decoupler springs are compressed to the limiting torque value and thus it can readily be set to unload the clutch band at any desired value.

Note that the crankshaft decoupler 10 of the present invention utilizes a trigger mechanism, and not a frictional coefficient for controlling the onset of slippage and is inherently more precise in operation.

Finally, the construction of the pulley, drive plate, carrier plate, band clutch, springs and bushings are such that inexpensive metal forming techniques and ordinary steels can be employed instead of the precision tolerances and premium materials as required by the prior art devices. The driven plate can be bushed to the hub or pulley with an inexpensive but highly durable plastic bushing.

Figure 10:
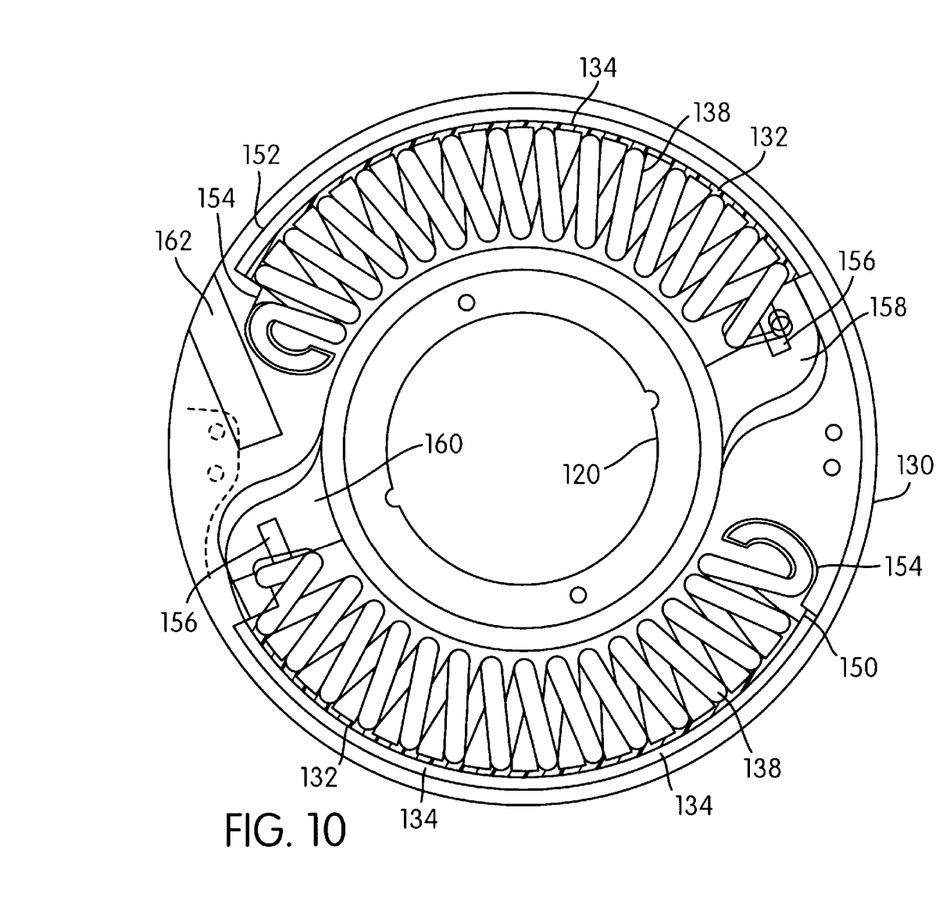
FIG. 10 is an end elevational view of a second embodiment of the present invention.
Figure 11:
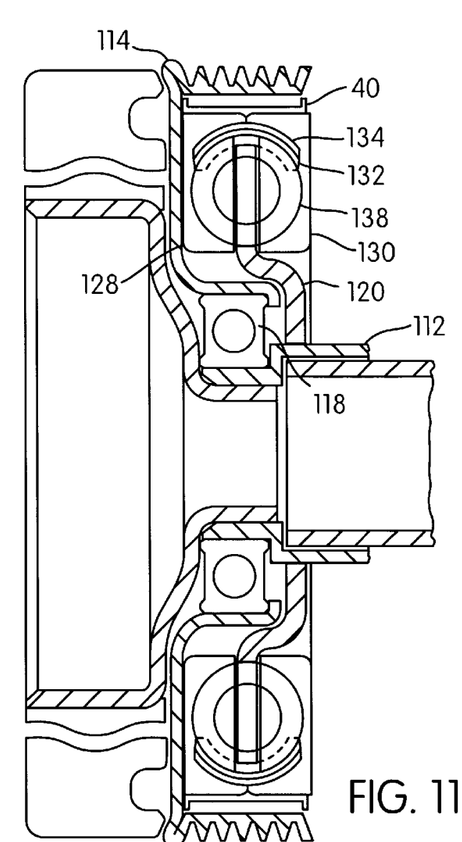
FIG. 11 is a sectional view of the embodiment of FIG. 11.

Referring to FIGS. 10 and 11, a second embodiment is illustrated. The crankshaft decoupler is ganged with a torsional vibrational damper 111. Drive plate 120 engages hub 112 for rotation therewith. Ball bearing assembly 118 is mounted on hub 112 while pulley 114 is mounted on the outer race of bearing assembly 118. Pulley 114 rotates relative to drive plate 120. In this embodiment, the torsion springs 138 are arcuate and encased in an annular carrier 126 comprising half discs 128 and 130. Torsion springs 138 has shoes 132 made of bearing material covering an outer portion of each coil. Sleeves 134 are seated within discs 128 and 130 for receiving shoes 132. Mounted on the outer circumferential surface of discs 128 and 130 is the double-wrap one way clutch band assembly 40.

Referring to FIG. 10, the disc 130 is illustrated in greater detail. Discs 128 and 130 are complementary and define arcuate spring cavities 150 and 152. The outer circumferential edge of spring cavities 150 and 152 is machined to receive sleeves 134. At one end of the cavities 150 and 152 is a hook cavity 154. Hook cavity 154 receives a bent end of springs 138. By bending the end of the springs 138 into a complementary hook shape, the spring 138 can act both in compression and tension. The complementary hook shape extends radially, while the opposite end 156 is bent to extend transversely. Opposite end 156 abuts arm 158 and 160 of drive plate 120.

In the preferred embodiment, sleeves 134 are made of a nickel base with a TEFLON coating on an inner face. Shoes 132 are made of an impact modified NYLON available under the designation DSM TW 363.

When assembled, sleeve 134 cradles the spring 138 with the shoes 132 intermediate thereof. Sleeve 134 presents a frictional surface for the shoes 132. As spring 138 expands and compresses, shoes 132 will rub against sleeve 134. The frictional forces created will act against the biasing forces of the spring 138.

Discs 128 and 130 each has a semi-circular channel 162 in the inner face.

When fitted together, an aperture is defined. Biasing spring 54 engages tab 52 of clutch assembly 40 for initially biasing the clutch assembly 40 for one-way engagement with the inner circumferential surface of pulley 114. The outer face of discs 128 and 130, each has a recess for receiving flaps of the clutch assembly for connecting bands 44 and 46 to the discs.

In use, rotational drive is applied to hub 112 which is transmitted to drive plate 120. The drive is transmitted through torsion springs 138 to discs 128 and 130. One-way clutch assembly 40 transmits the drive to pulley 114 which transmits the drive to the accessory belt (not illustrated). Reverse drives applied through the belt to pulley 114 will cause one-way clutch assembly to slip wherein pulley 114 will rotate relative to drive plate 120. Since the torsion springs 138 are arcuate, the drive loads will cause the springs 138 to buckle outwardly. The outward buckling will cause the shoes 132 to rub against each of the sleeves 134. The frictional rubbing of the shoes 132 and the sleeves 134 will dampen some of the vibrational effects caused by introducing the elasticity of springs 138 into the drive system.

Figure 12:
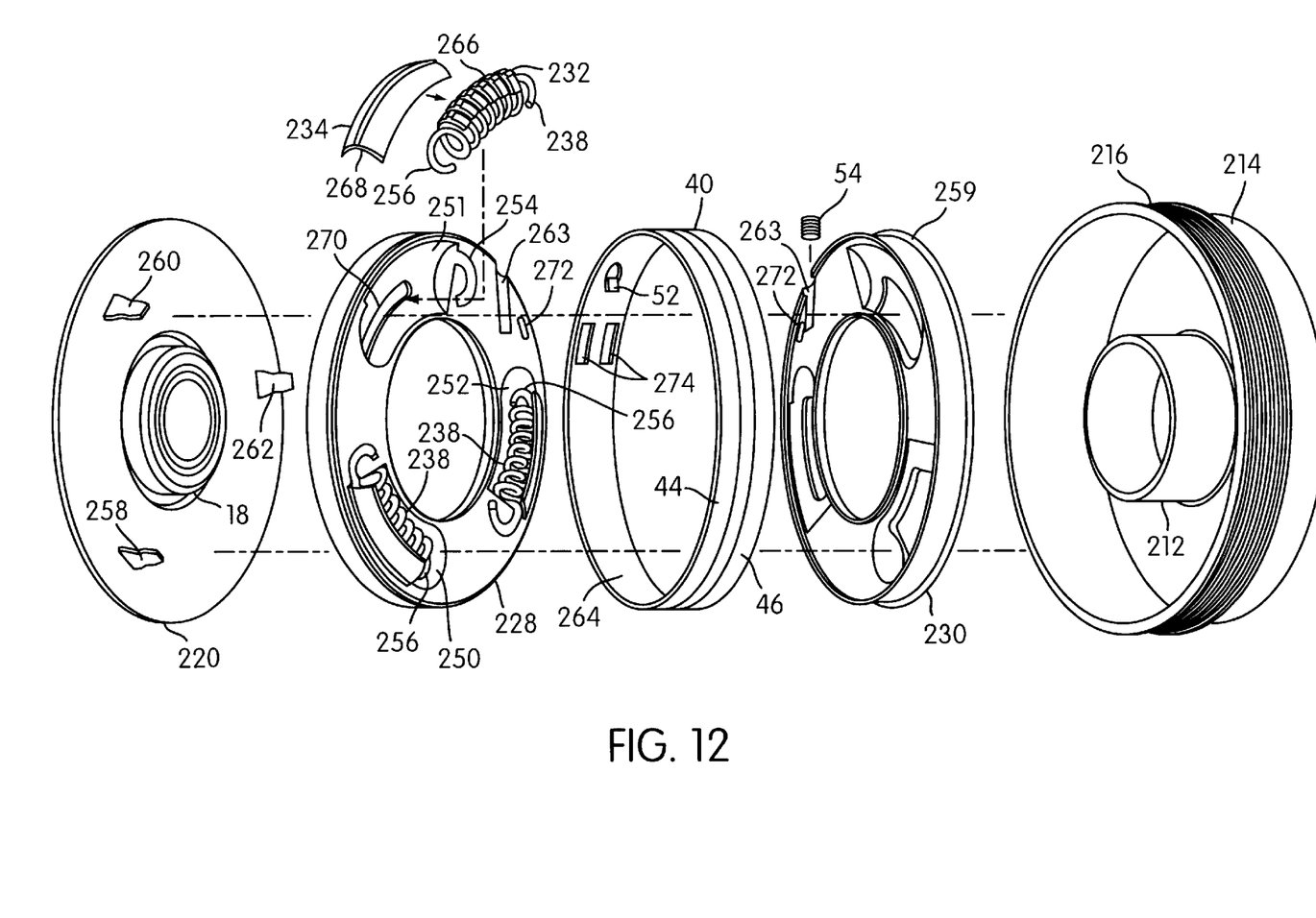
FIG. 12 is an exploded perspective view of a third embodiment of the present invention.

Referring to FIG. 12, a third embodiment of the present invention is illustrated. The third embodiment is similar to the second embodiment of FIGS. 10 and 11.

The crankshaft decoupler of the third embodiment has three arcuate torsional springs 238. The annular carrier comprises discs 228 and 230 which are complementary and define arcuate spring cavities 250, 251 and 252. The outer circumferential edge of spring cavities 250, 251 and 252 is machined to receive sleeves 234. A hook cavity 254 is at one end of the cavities. Hook cavity 254 receives a bent end of springs 238. The complementary hook shape extends radially, while the opposite end 256 is bent to extend transversely.

Discs 228 and 230 each has a semi-circular channel 263 in the inner face.

When fitted together, an aperture is defined, in which biasing spring 54 is inserted. Biasing spring 54 engages tab 52 of clutch assembly 40 for initially biasing the clutch assembly 40 for one-way engagement with the inner circumferential surface of pulley 214. The outer circumferential surface of discs 228 and 230, each has a transverse aperture 272 communicating with radial apertures for receiving connectors such as nut and bolt combinations or rivets to connect clutch bands 44 and 46 to the discs.

Drive plate 220 has arms 258, 260 and 262 which extend transversely through arcuate slots 270 in each of channels 263 of disc 228 to engage the opposite end 256 of springs 238.

Clutch assembly 40 is seated within an annular band 264 mounted about the annular carrier. Disc 230 has a lip 259 for retaining band 264 on the annular carrier. Annular band 264 has two apertures 274 which are positioned where clutch bands 44 and 46 are connected to the discs 228 and 230. Annular band 264 is preferably made of the same material as the shoes 232.

Optionally, shoes 232 can be connected together by a tether for retaining the shoes together for assembly purposes. Shoes 232 have a protrusion 266 which complementarily fits with circumferential groove 268 on sleeve 234. The complementary fit keeps the shoes from working out of place from between the spring and sleeve.

Pulley 214 is cup-shaped having an inner hub 212 and V-grooves 216 on the outer circumference. Pulley 214 is preferably cold formed from a single sheet of steel.

Once assembled, the crankshaft decoupler of the third embodiment operates in the same manner as described above. Rotational drive is applied to drive plate 220. The drive is transmitted through torsion springs 238 to discs 228 and 230. One-way clutch assembly 40 transmits the drive to pulley 114 which transmits the drive to the accessory belt (not illustrated).

The length of the arcuate slots 270 and the deflection strength of springs 238 will dictate the force at which drive plate 220 and arms 258, 260 and 262 will overcome the spring force and urge rotation of the annular carrier relative to the clutch assembly 40 to limit the torque transmitted by the crankshaft decoupler. Excessive force will result in disengagement of the clutch assembly 40 allowing relative slippage between the drive plate 220 and pulley 214.

It is now apparent to a person skilled in the art that the crankshaft decoupler of the present invention could be readily modified. It is understood that certain changes in style, size and components may be effective without departure from the spirit of the invention and within the scope of the appended claims.

It is particularly understood that although the biasing device mounted between the inner hub and the mounting hub is disclosed as being torsion springs, such springs could be replaced with a conventional rubber springs.

We claim:

1. A shaft decoupler comprising
   a mounting hub mountable on a shaft,
   a pulley rotatably mounted on said hub, said pulley engageable with an accessory drive belt,
   a carrier connecting member operatively disposed between said mounting hub and said pulley,
   a spring elastically coupling said hub to said carrier connecting member, and
   a one-way clutch connected with said carrier connecting member such that said connecting member connects said spring in series with said one-way clutch, said one-way clutch constructed and arranged to couple said pulley with said hub to enable said shaft and said pulley to be resiliently coupled to one another by said spring and thus enable said spring to damp rotational forces transmitted between the mounting hub and the pulley in response to a first predetermined torque relationship between said shaft and said pulley, said one-way clutch constructed and arranged to de-couple said pulley from said hub to enable said pulley and said shaft to rotate independently in response to a second predetermine torque relationship between the shaft and the pulley.

2. A decoupler as claimed in claim 1, further comprising a drive plate fixed to said hub, wherein said one-way clutch is a band having a fixed end connected to said carrier connecting member and a biased end connected to a biasing means connected to said drive plate.

3. A decoupler as claimed in claim 2 wherein said band disposed a double wrap band comprising a lapping strip connected to two lapped strips, said lapping strip is between said two lapped strips when wrapped about said annular carrier.

4. A decoupler as claimed in claim 2 wherein said fixed end is at a remote end of said two lapped strips and said biased end is at a remote end of said lapping strip.

5. A decoupler as claimed in claim 4 wherein said remote end of the lapping strip has a tab for operably engaging said drive plate when said drive plate is angularly displaced relative to said carrier connecting member by a predetermined amount.

6. A decoupler as claimed in claim 5 wherein said pulley has an inner circumferential rim, and wherein said band has a frictional material on a surface thereof for engaging said inner rim.

7. A decoupler as claimed in claim 1 wherein said spring comprises a coil spring.

8. A decoupler as claimed in claim 7 wherein said coil spring comprises one of a plurality of coil springs disposed in circumferentially spaced relation to one another.

9. A decoupler as claimed in claim 8 wherein said carrier connecting member has cavities for cradling each of said coil springs.

10. A decoupler as claimed in claim 9 wherein each coil of said coil springs has a shoe of a frictional material, said shoes frictionally engaging said carrier connecting member and providing damping forces.

11. A decoupler as claimed in claim 10 wherein said carrier connecting member includes a sleeve received within each of said cavities and presenting a frictional surface for said shoes.

12. A decoupler as claimed in claim 1 wherein said mounting hub is integral with a drive plate, said spring connected between said drive plate and said carrier connecting member.

13. A crankshaft decoupler as claimed in claim 1 wherein said crankshaft decoupler is ganged with a torsional vibration damper.

* * * * *